US012722292B2

(12) United States Patent
Imanishi

(10) Patent No.: US 12,722,292 B2
(45) Date of Patent: Sep. 1, 2026

(54) NUMERICAL CONTROL DEVICE AND NUMERICAL CONTROL SYSTEM

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 19/123,219

(22) PCT Filed: Nov. 7, 2022

(86) PCT No.: PCT/JP2022/041386
§ 371 (c)(1),
(2) Date: Apr. 22, 2025

(87) PCT Pub. No.: WO2024/100718
PCT Pub. Date: May 16, 2024

(65) Prior Publication Data
US 2026/0145323 A1 May 28, 2026

(51) Int. Cl.
*B25J 9/16* (2006.01)

(52) U.S. Cl.
CPC ........... *B25J 9/1653* (2013.01); *B25J 9/1674* (2013.01); *G05B 2219/39001* (2013.01)

(58) Field of Classification Search
CPC .................. B25J 9/1674; B25J 9/1653; G05B 2219/39001
See application file for complete search history.

(56) References Cited

U.S. PATENT DOCUMENTS

2015/0314445 A1* 11/2015 Naitou ................... B25J 9/1674 700/258
2016/0327934 A1* 11/2016 Morimoto .............. B25J 9/1653
(Continued)

FOREIGN PATENT DOCUMENTS

CN 111547176 B 9/2021
CN 109562513 B 6/2022
(Continued)

OTHER PUBLICATIONS

International Search Report issued in PCT/JP2022/041386; mailed Jan. 10, 2023.

*Primary Examiner* — Adam R Mott
*Assistant Examiner* — Sagar Kc
(74) *Attorney, Agent, or Firm* — Studebaker Brackett PLLC

(57) ABSTRACT

The present invention provides a numerical control device and a numerical control system that can prevent accidental contact stops when a cooperating robot acts on a workpiece. The numerical control device uses a numerical control program to control a robot via a robot control device, and comprises: an analysis unit; a payload-switching distance setting unit that generates a signal for setting a payload-switching distance; a payload setting selection unit that generates a signal for selecting a payload setting for the robot; and a robot instruction signal generation unit that generates a robot instruction signal and transmits the robot instruction signal to the robot control device. After switching the payload setting, the robot control device prohibits the robot from performing a contact stop operation to stop the motion of the robot in response to an external contact force while the robot is moving within the payload-switching distance.

16 Claims, 9 Drawing Sheets

(56) References Cited

U.S. PATENT DOCUMENTS

| | | | |
|---|---|---|---|
| 2022/0011754 A1* | 1/2022 | Sagasaki .......... | G05B 19/41835 |
| 2022/0197299 A1 | 6/2022 | Zhang et al. | |
| 2022/0305678 A1* | 9/2022 | Talebi .................... | B25J 9/1638 |

FOREIGN PATENT DOCUMENTS

| | | |
|---|---|---|
| JP | 2008-183680 A | 8/2008 |
| JP | 2009-050958 A | 3/2009 |
| JP | 2014-241018 A | 12/2014 |
| JP | 6647472 B1 | 2/2020 |
| TW | I770965 B | 7/2022 |
| WO | 2020/045483 A1 | 3/2020 |
| WO | 2022/224425 A1 | 10/2022 |

* cited by examiner 1
2
3
3a
3b
4
5

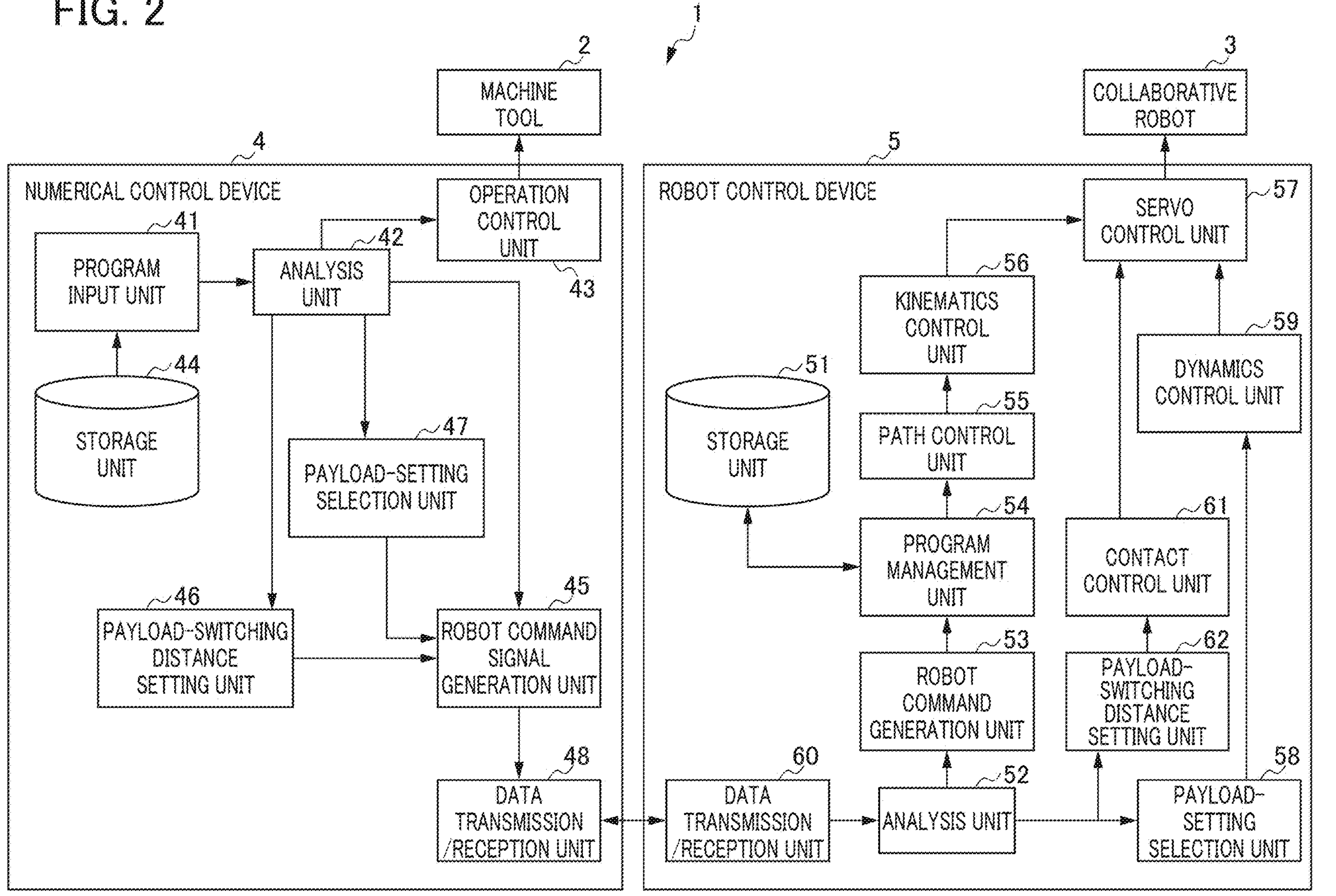
FIG. 2
1
2
MACHINE TOOL
3
COLLABORATIVE ROBOT
4
NUMERICAL CONTROL DEVICE
41
PROGRAM INPUT UNIT
42
ANALYSIS UNIT
43
OPERATION CONTROL UNIT
44
STORAGE UNIT
47
PAYLOAD-SETTING SELECTION UNIT
46
PAYLOAD-SWITCHING DISTANCE SETTING UNIT
45
ROBOT COMMAND SIGNAL GENERATION UNIT
48
DATA TRANSMISSION /RECEPTION UNIT
5
ROBOT CONTROL DEVICE
57
SERVO CONTROL UNIT
56
KINEMATICS CONTROL UNIT
59
DYNAMICS CONTROL UNIT
51
STORAGE UNIT
55
PATH CONTROL UNIT
54
PROGRAM MANAGEMENT UNIT
61
CONTACT CONTROL UNIT
53
ROBOT COMMAND GENERATION UNIT
62
PAYLOAD-SWITCHING DISTANCE SETTING UNIT
60
DATA TRANSMISSION /RECEPTION UNIT
52
ANALYSIS UNIT
58
PAYLOAD-SETTING SELECTION UNIT

FIG. 3

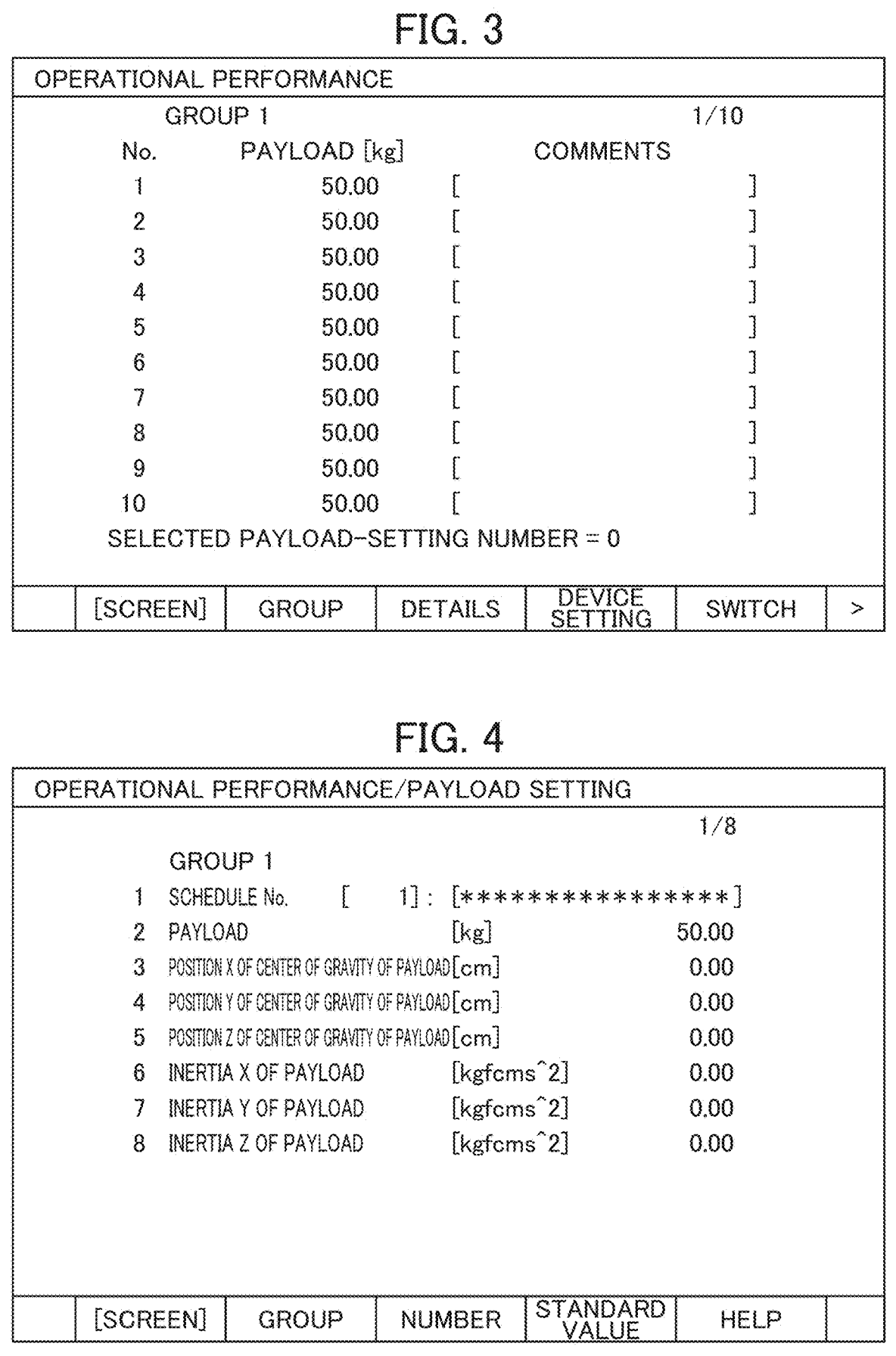

OPERATIONAL PERFORMANCE

GROUP 1 1/10

| No. | PAYLOAD [kg] | COMMENTS |
|---|---|---|
| 1 | 50.00 | [ ] |
| 2 | 50.00 | [ ] |
| 3 | 50.00 | [ ] |
| 4 | 50.00 | [ ] |
| 5 | 50.00 | [ ] |
| 6 | 50.00 | [ ] |
| 7 | 50.00 | [ ] |
| 8 | 50.00 | [ ] |
| 9 | 50.00 | [ ] |
| 10 | 50.00 | [ ] |

SELECTED PAYLOAD-SETTING NUMBER = 0

| | [SCREEN] | GROUP | DETAILS | DEVICE SETTING | SWITCH | > |
|---|---|---|---|---|---|---|

FIG. 4

OPERATIONAL PERFORMANCE/PAYLOAD SETTING

1/8

GROUP 1

| | | | |
|---|---|---|---|
| 1 | SCHEDULE No. [ 1] : | [****************] | |
| 2 | PAYLOAD | [kg] | 50.00 |
| 3 | POSITION X OF CENTER OF GRAVITY OF PAYLOAD | [cm] | 0.00 |
| 4 | POSITION Y OF CENTER OF GRAVITY OF PAYLOAD | [cm] | 0.00 |
| 5 | POSITION Z OF CENTER OF GRAVITY OF PAYLOAD | [cm] | 0.00 |
| 6 | INERTIA X OF PAYLOAD | [kgfcms^2] | 0.00 |
| 7 | INERTIA Y OF PAYLOAD | [kgfcms^2] | 0.00 |
| 8 | INERTIA Z OF PAYLOAD | [kgfcms^2] | 0.00 |

| | [SCREEN] | GROUP | NUMBER | STANDARD VALUE | HELP | |
|---|---|---|---|---|---|---|

FIG. 5

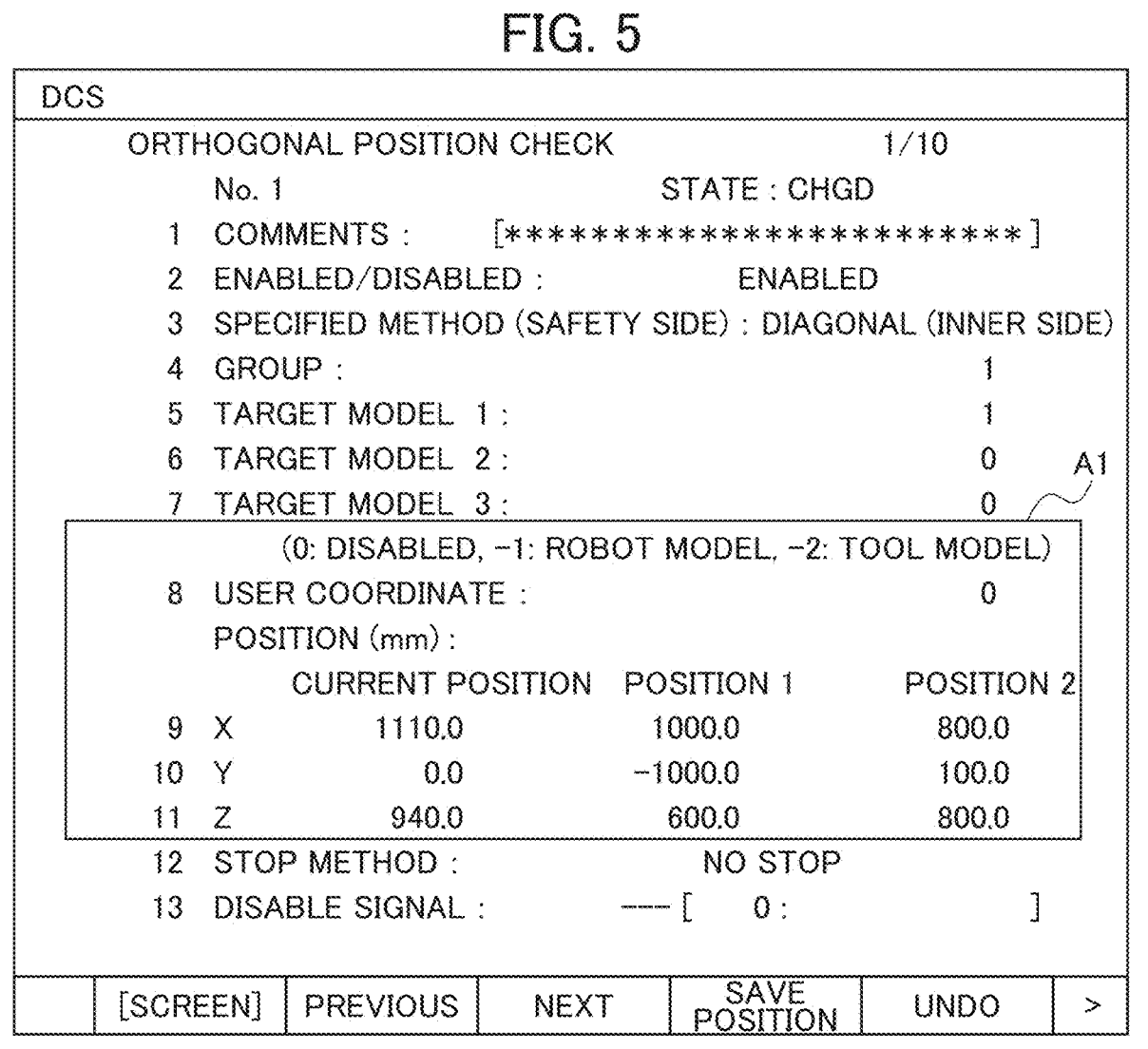

DCS

ORTHOGONAL POSITION CHECK 1/10

No. 1 STATE : CHGD

1 COMMENTS : [************************]

2 ENABLED/DISABLED : ENABLED

3 SPECIFIED METHOD (SAFETY SIDE) : DIAGONAL (INNER SIDE)

4 GROUP : 1

5 TARGET MODEL 1 : 1

6 TARGET MODEL 2 : 0

7 TARGET MODEL 3 : 0

A1

(0: DISABLED, −1: ROBOT MODEL, −2: TOOL MODEL)

8 USER COORDINATE : 0

POSITION (mm) :

| | | CURRENT POSITION | POSITION 1 | POSITION 2 |
|---|---|---|---|---|
| 9 | X | 1110.0 | 1000.0 | 800.0 |
| 10 | Y | 0.0 | −1000.0 | 100.0 |
| 11 | Z | 940.0 | 600.0 | 800.0 |

12 STOP METHOD : NO STOP

13 DISABLE SIGNAL : ---- [ 0 : ]

| | [SCREEN] | PREVIOUS | NEXT | SAVE POSITION | UNDO | > |
|---|---|---|---|---|---|---|

FIG. 6

EXAMPLE OF NUMERICAL CONTROL PROGRAM

```
O123

G100;                                ←SELECT PAYLOAD SETTING 1 (HAND ONLY)
G68.8;                               ←SELECT EACH AXIS COORDINATE SYSTEM
G7.3 J1=_J2=_J3=_J4=_J5=_J6=_;       ←POSITION AT INITIAL POSITION BY OPERATING EACH AXIS
・・・
G68.9;                               ←SELECT ORTHOGONAL COORDINATE SYSTEM
G01 X_Y_Z_A_B_C_P_;                  ←LINEARLY MOVE TO WORKPIECE PICKUP POSITION
G200.1 X0.0 Y0.0 Z5.0   (1)          SET PAYLOAD-SWITCHING DISTANCE IN POSITIVE DIRECTION, AND DISABLE CONTACT STOP UNTIL MOVING 5.0 mm IN +Z DIRECTION
G200.2 X0.0 Y0.0 Z0.0                SET PAYLOAD-SWITCHING DISTANCE IN NEGATIVE DIRECTION, AND ENABLE CONTACT STOP IN NEGATIVE DIRECTION

M100;
                                     ←CLOSE HAND (GRIP WORKPIECE)
G101;
G01 X_Y_Z_A_B_C_P_;                  ←SELECT PAYLOAD SETTING 2 (HAND + WORKPIECE)
                                     ←LIFT WORKPIECE
・・・・・
M50 ;
G01 X_Y_Z_A_B_C_P_;                  ←OPEN CHUCK
M51 ;                                ←LINEARLY MOVE TO CHUCK POSITION
G200.1 X5.0 Y0.0 Z0.0   (2)          ←CLOSE CHUCK
G200.2 X0.0 Y0.0 Z0.0                SET PAYLOAD-SWITCHING DISTANCE IN POSITIVE DIRECTION, AND DISABLE CONTACT STOP UNTIL MOVING 5.0 mm IN +X DIRECTION
                                     SET PAYLOAD-SWITCHING DISTANCE IN NEGATIVE DIRECTION, AND ENABLE CONTACT STOP IN NEGATIVE DIRECTION
M101;

G100;                                ←OPEN HAND (RELEASE WORKPIECE)
G01 X_Y_Z_A_B_C_P_;
                                     ←SELECT PAYLOAD SETTING 1 (HAND ONLY)
・・・                                ←RETREAT FROM CHUCK POSITION

M30 ;
```

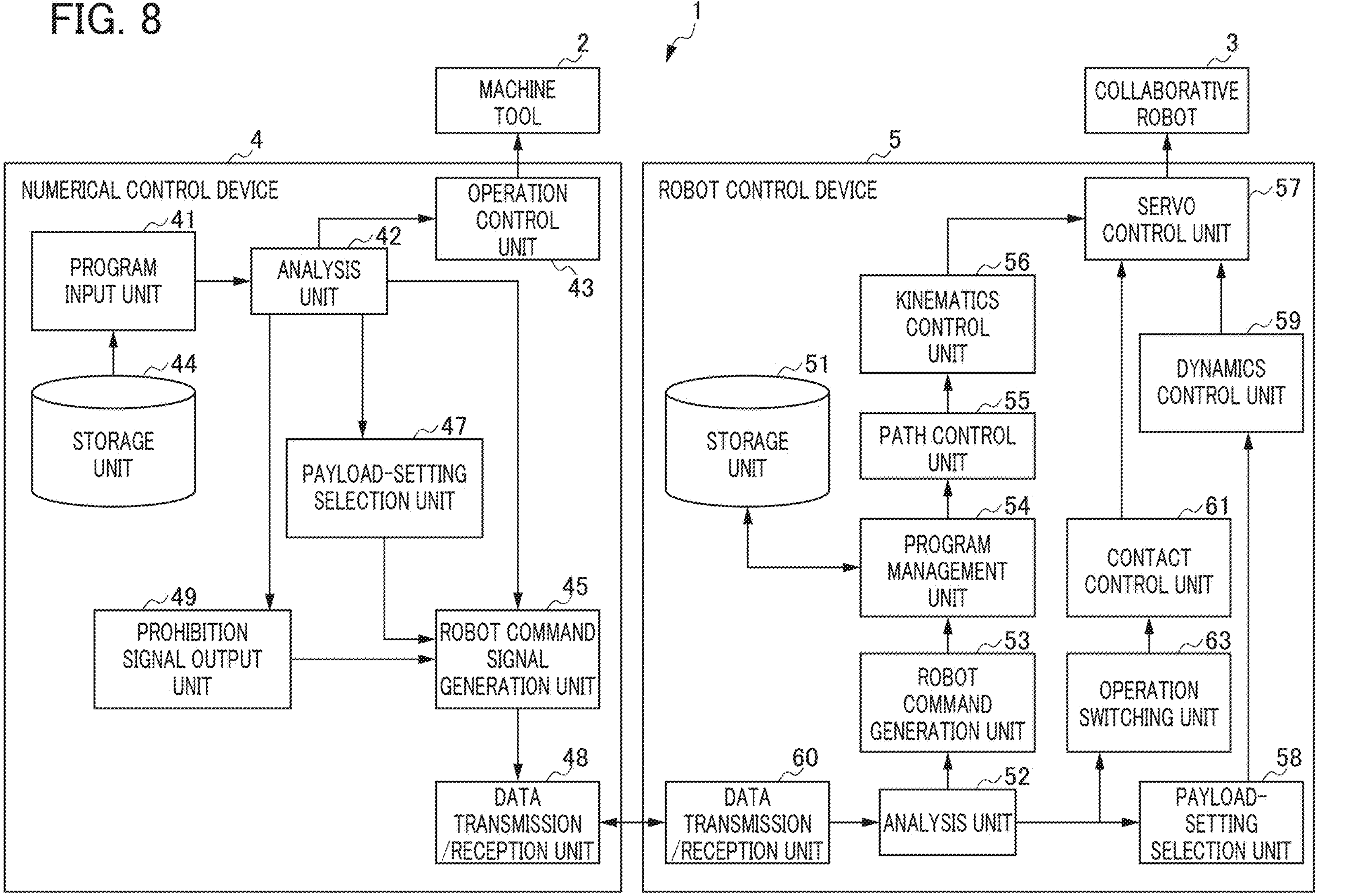
FIG. 8
1
2
MACHINE TOOL
3
COLLABORATIVE ROBOT
4
NUMERICAL CONTROL DEVICE
41
PROGRAM INPUT UNIT
44
STORAGE UNIT
42
ANALYSIS UNIT
43
OPERATION CONTROL UNIT
47
PAYLOAD-SETTING SELECTION UNIT
49
PROHIBITION SIGNAL OUTPUT UNIT
45
ROBOT COMMAND SIGNAL GENERATION UNIT
48
DATA TRANSMISSION /RECEPTION UNIT
5
ROBOT CONTROL DEVICE
51
STORAGE UNIT
60
DATA TRANSMISSION /RECEPTION UNIT
52
ANALYSIS UNIT
53
ROBOT COMMAND GENERATION UNIT
54
PROGRAM MANAGEMENT UNIT
55
PATH CONTROL UNIT
56
KINEMATICS CONTROL UNIT
57
SERVO CONTROL UNIT
59
DYNAMICS CONTROL UNIT
61
CONTACT CONTROL UNIT
63
OPERATION SWITCHING UNIT
58
PAYLOAD-SETTING SELECTION UNIT

FIG. 9

EXAMPLE OF NUMERICAL CONTROL PROGRAM

```
O123

G100;                                 ←SELECT PAYLOAD SETTING 1 (HAND ONLY)
G68.8;                                ←각 SELECT EACH AXIS COORDINATE SYSTEM
G7.3 J1=_J2=_J3=_J4=_J5=_J6=_;        ←POSITION AT INITIAL POSITION BY OPERATING EACH AXIS
・・・
G68.9;                                ←SELECT ORTHOGONAL COORDINATE SYSTEM
G01 X_Y_Z_A_B_C_P_;                   ←LINEARLY MOVE TO WORKPIECE PICKUP POSITION
M100;                                 ←CLOSE HAND (GRIP WORKPIECE)

G200.1;               (11)            ←TURN ON CONTACT STOP DETERMINATION PROHIBITION SIGNAL AFTER PAYLOAD IS SWITCHED
G101;                                 ←SELECT PAYLOAD SETTING 2 (HAND + WORKPIECE)
G01 X_Y_Z_A_B_C_P_;   (12)            ←LIFT WORKPIECE
G200.0;                               ←TURN OFF CONTACT STOP DETERMINATION PROHIBITION SIGNAL AFTER PAYLOAD IS SWITCHED

・・・・・・
M50 ;                                 ←OPEN CHUCK
G01 X_Y_Z_A_B_C_P_;                   ←LINEARLY MOVE TO CHUCK POSITION
M51 ;                                 ←CLOSE CHUCK

M101;                                 ←OPEN HAND (RELEASE WORKPIECE)
G200.1;               (13)            ←TURN ON CONTACT STOP DETERMINATION PROHIBITION SIGNAL AFTER PAYLOAD IS SWITCHED
G100;                                 ←SELECT PAYLOAD SETTING 1 (HAND ONLY)
G01 X_Y_Z_A_B_C_P_;   (14)            ←RETREAT FROM CHUCK POSITION
G200.0;                               ←TURN OFF CONTACT STOP DETERMINATION PROHIBITION SIGNAL AFTER PAYLOAD IS SWITCHED

・・・

M30 ;
```

Figure 10:
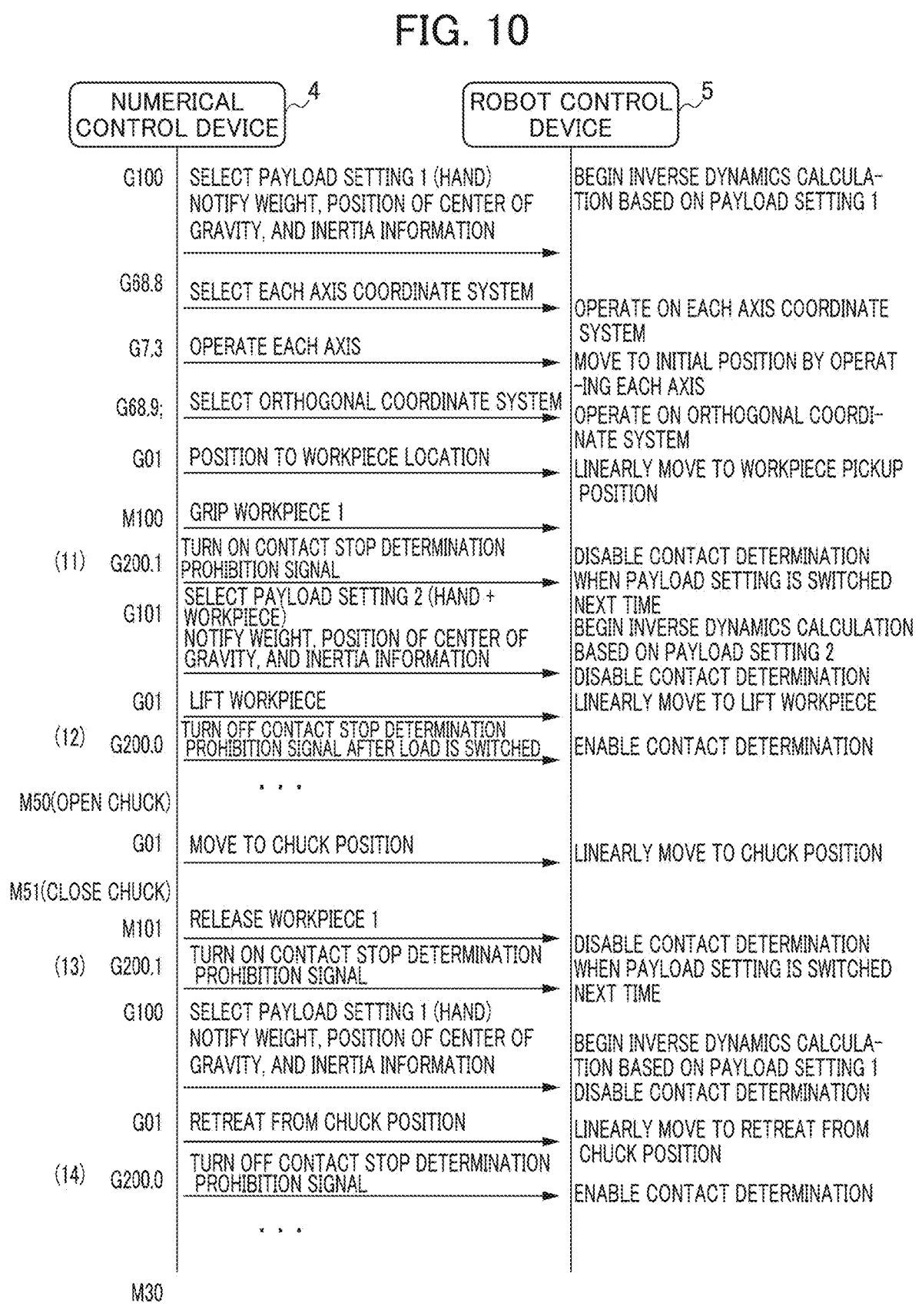

NUMERICAL CONTROL DEVICE 4 | ROBOT CONTROL DEVICE 5

| Code | NUMERICAL CONTROL DEVICE → | ROBOT CONTROL DEVICE |
|---|---|---|
| G100 | SELECT PAYLOAD SETTING 1 (HAND) NOTIFY WEIGHT, POSITION OF CENTER OF GRAVITY, AND INERTIA INFORMATION | BEGIN INVERSE DYNAMICS CALCULATION BASED ON PAYLOAD SETTING 1 |
| G68.8 | SELECT EACH AXIS COORDINATE SYSTEM | OPERATE ON EACH AXIS COORDINATE SYSTEM |
| G7.3 | OPERATE EACH AXIS | MOVE TO INITIAL POSITION BY OPERATING EACH AXIS |
| G68.9; | SELECT ORTHOGONAL COORDINATE SYSTEM | OPERATE ON ORTHOGONAL COORDINATE SYSTEM |
| G01 | POSITION TO WORKPIECE LOCATION | LINEARLY MOVE TO WORKPIECE PICKUP POSITION |
| M100 | GRIP WORKPIECE 1 | |
| (11) G200.1 | TURN ON CONTACT STOP DETERMINATION PROHIBITION SIGNAL | DISABLE CONTACT DETERMINATION WHEN PAYLOAD SETTING IS SWITCHED NEXT TIME |
| G101 | SELECT PAYLOAD SETTING 2 (HAND + WORKPIECE) NOTIFY WEIGHT, POSITION OF CENTER OF GRAVITY, AND INERTIA INFORMATION | BEGIN INVERSE DYNAMICS CALCULATION BASED ON PAYLOAD SETTING 2 DISABLE CONTACT DETERMINATION |
| G01 | LIFT WORKPIECE | LINEARLY MOVE TO LIFT WORKPIECE |
| (12) G200.0 | TURN OFF CONTACT STOP DETERMINATION PROHIBITION SIGNAL AFTER LOAD IS SWITCHED | ENABLE CONTACT DETERMINATION |
| | . . . | |
| M50(OPEN CHUCK) | | |
| G01 | MOVE TO CHUCK POSITION | LINEARLY MOVE TO CHUCK POSITION |
| M51(CLOSE CHUCK) | | |
| M101 | RELEASE WORKPIECE 1 | |
| (13) G200.1 | TURN ON CONTACT STOP DETERMINATION PROHIBITION SIGNAL | DISABLE CONTACT DETERMINATION WHEN PAYLOAD SETTING IS SWITCHED NEXT TIME |
| G100 | SELECT PAYLOAD SETTING 1 (HAND) NOTIFY WEIGHT, POSITION OF CENTER OF GRAVITY, AND INERTIA INFORMATION | BEGIN INVERSE DYNAMICS CALCULATION BASED ON PAYLOAD SETTING 1 DISABLE CONTACT DETERMINATION |
| G01 | RETREAT FROM CHUCK POSITION | LINEARLY MOVE TO RETREAT FROM CHUCK POSITION |
| (14) G200.0 | TURN OFF CONTACT STOP DETERMINATION PROHIBITION SIGNAL | ENABLE CONTACT DETERMINATION |
| | . . . | |
| M30 | | |

NUMERICAL CONTROL DEVICE AND NUMERICAL CONTROL SYSTEM

TECHNICAL FIELD

The present disclosure relates to a numerical control device and a numerical control system.

BACKGROUND ART

Conventionally, technologies concerning collaborative robots that stop operating upon detecting contact with humans have been disclosed. For instance, in order to accurately measure the contact force of a collaborative robot, technologies for setting the payload information on a workpiece being held have been disclosed.

In order to automate machining sites, technologies concerning systems for operating robots from machine tools have been disclosed. For example, technologies for operating robots using numerical control commands familiar to machine tool users have been disclosed (see, for example, Patent Document 1).

CITATION LIST

Patent Document

Patent Document 1: Japanese Unexamined Patent Application, Publication No. 2014-241018

DISCLOSURE OF THE INVENTION

Problems to be Solved by the Invention

When a collaborative robot picks up or places a workpiece, external forces are exerted on the collaborative robot. A discrepancy may arise between the timing for changing the payload setting and the actual timing for the robot to pick up or place the workpiece. Consequently, the discrepancy between the payload setting and the actual payload may hamper the robot control device from accurately calculating the contact force, resulting in erroneous determination that the robot is in a contact state, potentially causing the collaborative robot to stop operating.

When a numerical control program commands the collaborative robot to pick up and place workpieces, and a discrepancy arises between the timing for changing the payload setting and the actual payload state of the collaborative robot, the collaborative robot may fail in accurately calculating the contact force.

Therefore, there is a demand for a numerical control device and a numerical control system capable of preventing erroneous contact stops when a collaborative robot interacts with a workpiece.

Means for Solving the Problems

An aspect of the present disclosure provides a numerical control device that controls a robot via a robot control device using a numerical control program, in which the numerical control device includes: an analysis unit that analyzes a robot control command in the numerical control program; a payload-switching distance setting unit that generates a signal for setting a payload-switching distance required for switching a payload setting of the robot, based on the robot control command analyzed by the analysis unit; a payload-setting selection unit that generates a signal for Selecting the payload setting of the robot, based on the robot control command analyzed by the analysis unit; and a robot command signal generation unit that generates a robot command signal, including a signal for setting the payload-switching distance and a signal for selecting the payload setting of the robot, based on the robot control command analyzed by the analysis unit, and transmits the robot command signal to the robot control device. After switching the payload setting, the robot control device prohibits the robot from executing a contact stop operation to stop operating in response to an external contact force while the robot is moving within the payload-switching distance.

An aspect of the present disclosure provides a numerical control system that controls a robot via a robot control device using a numerical control program of a numerical control device, in which the numerical control device includes: an analysis unit that analyzes a robot control command in the numerical control program; a payload-switching distance setting unit that generates a signal for setting a payload-switching distance required for switching a payload setting of the robot, based on the robot control command analyzed by the analysis unit; a payload-setting selection unit that generates a signal for selecting the payload setting of the robot, based on the robot control command analyzed by the analysis unit; and a robot command signal generation unit that generates a robot command signal, including a signal for setting the payload-switching distance and a signal for selecting the payload setting of the robot, based on the robot control command analyzed by the analysis unit, and transmits the robot command signal to the robot control device. The robot control device includes: a robot-side payload-setting selection unit that switches the payload setting, based on the robot command signal; a dynamics control unit that executes inverse dynamics calculation for the robot in accordance with the payload setting, based on the robot command signal; a robot-side payload-switching distance setting unit that sets the payload-switching distance, based on the robot command signal; and a contact control unit that prohibits the robot from executing a contact stop operation to stop operating in response to an external contact force while the robot is moving within the payload-switching distance, after switching the payload setting in response to a notification of the payload setting.

An aspect of the present disclosure provides a numerical control device that controls a robot via a robot control device using a numerical control program, in which the numerical control device includes: an analysis unit that analyzes a robot control command in the numerical control program; a prohibition signal output unit that generates a contact stop operation prohibition signal to prohibit the robot from executing a contact stop operation, based on the robot control command analyzed by the analysis unit; a payload-setting selection unit that generates a signal for selecting a payload setting of the robot, based on the robot control command analyzed by the analysis unit; and a robot command signal generation unit that generates a robot command signal, including the contact stop operation prohibition signal and a signal for selecting the payload setting of the robot, based on the robot control command analyzed by the analysis unit, and transmits the robot command signal to the robot control device. After switching the payload setting, the robot control device prohibits the robot from executing a contact stop operation to stop operating in response to an external contact force, based on the contact stop operation prohibition signal.

An aspect of the present disclosure provides a numerical control system that controls a robot via a robot control device using a numerical control program of a numerical control device, in which the numerical control device includes: an analysis unit that analyzes a robot control command in the numerical control program; a prohibition signal output unit that generates a contact stop operation prohibition signal to prohibit the robot from executing a contact stop operation, based on the robot control command analyzed by the analysis unit; a payload-setting selection unit that generates a signal for selecting a payload setting of the robot, based on the robot control command analyzed by the analysis unit; and a robot command signal generation unit that generates a robot command signal, including the contact stop operation prohibition signal and a signal for selecting the payload setting of the robot, based on the robot control command analyzed by the analysis unit, and transmits the robot command signal to the robot control device. The robot control device includes: a robot-side payload-setting selection unit that switches the payload setting, based on the robot command signal; a dynamics control unit that executes inverse dynamics calculation for the robot in accordance with the payload setting, based on the robot command signal; and a contact control unit that prohibits the robot from executing a contact stop operation to stop operating in response to an external contact force, based on the contact stop operation prohibition signal, after switching the payload setting in response to a notification of the payload setting.

BRIEF DESCRIPTION OF THE DRAWINGS

FIG. 2 is a functional block diagram of a numerical control device and a robot control device according to a first embodiment;

FIG. 3 is a diagram illustrating an example of payload information;

FIG. 4 is a diagram illustrating the payload information of Group 1 displayed when Group 1 in FIG. 3 is selected;

FIG. 5 is a diagram illustrating an example of setting the operating range of a collaborative robot;

FIG. 6 is an example of a numerical control program according to the first embodiment;

FIG. 7 is a sequence diagram illustrating the flow of signals and information between the numerical control device and the robot control device when executing the numerical control program illustrated in FIG. 6;

FIG. 8 is a functional block diagram of the numerical control device and the robot control device according to a second embodiment;

FIG. 9 is a diagram illustrating an example of the numerical control program according to the second embodiment; and FIG. 10 is a sequence diagram illustrating the flow of signals and information between the numerical control device and the robot control device when executing the numerical control program illustrated in FIG. 9.

PREFERRED MODE FOR CARRYING OUT THE INVENTION

Figure 1:
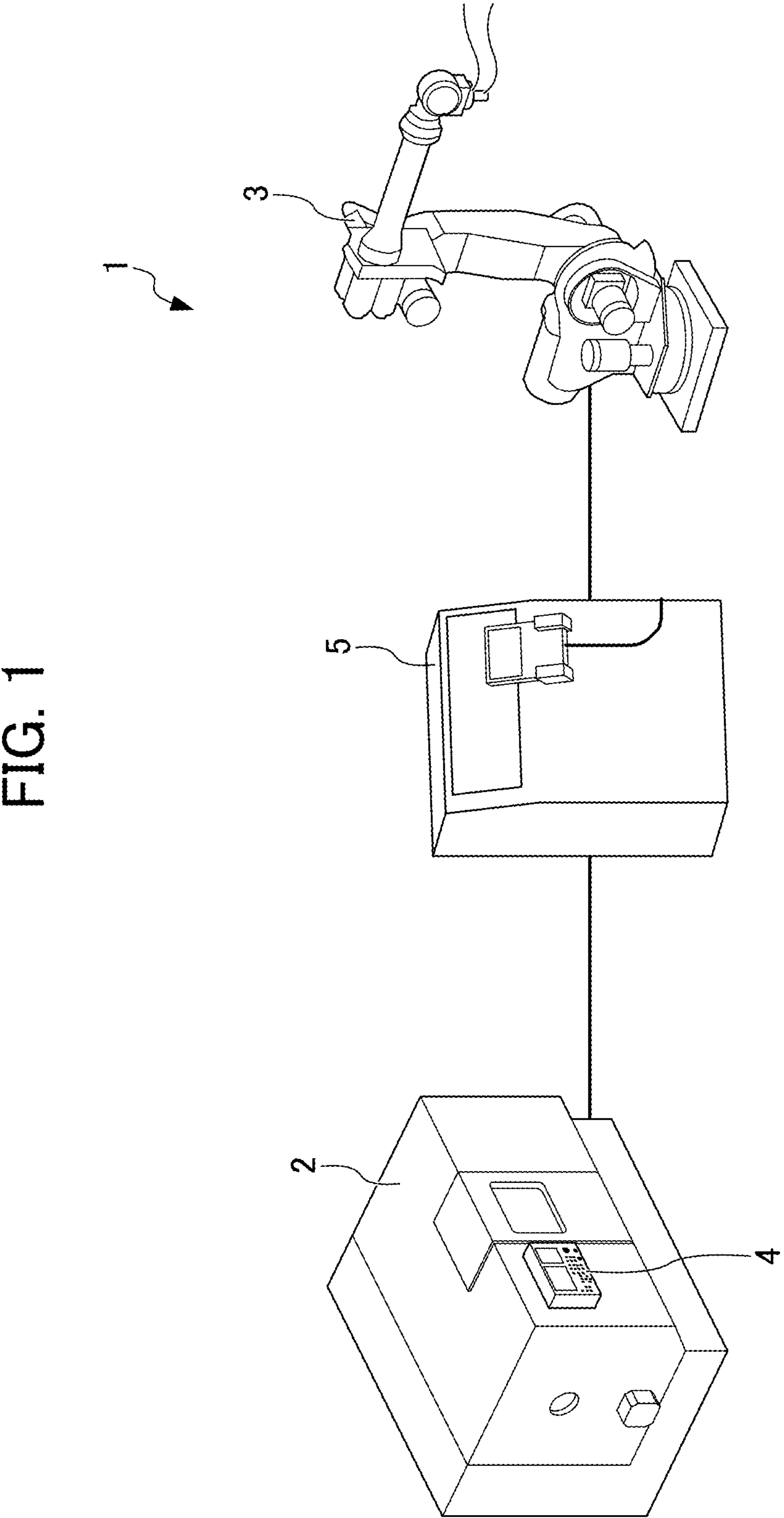
FIG. 1 is a block diagram illustrating the configuration of a numerical control system according to the present embodiment.

Hereinafter, an example of embodiments of the present disclosure will be described. FIG. 1 is a schematic diagram of a numerical control system 1 according to the present embodiment.

The numerical control system 1 includes a machine tool 2 that machines a workpiece (not illustrated), a numerical control device (CNC) 4 that controls the operation of the machine tool 2, a collaborative robot 3 installed near the machine tool 2, and a robot control device 5 that controls the operation of the collaborative robot 3. The numerical control system 1 utilizes the numerical control device 4 and the robot control device 5 communicatively connected to each other, thereby integrally controlling the operations of the machine tool 2 and the collaborative robot 3.

The machine tool 2 machines the workpiece (not illustrated) in accordance with machine tool control signals transmitted from the numerical control device 4. The machine tool 2 may include, for example, a lathe, drill press, milling machine, grinding machine, laser processing machine, or injection molding machine; however, this is not limiting.

The collaborative robot 3 operates under the control of the robot control device 5, and for example, executes predetermined tasks on the workpiece machined by the machine tool 2. The collaborative robot 3 is, for instance, a multi-joint robot with an arm, which includes a tip 3*a* attached with a tool 3*b* for gripping, machining, or inspecting the workpiece. In the following description, the collaborative robot 3 is described as a six-axis multi-joint robot; however, this is not limiting. In the following description, the collaborative robot 3 is described as a six-axis multi-joint robot; however, the number of axes is not limited thereto.

The collaborative robot 3 is provided with functions such as a contact stop function, a retreat mode function, and a reverse operation function, thus can safely work in collaboration with humans. The contact stop function immediately stops the robot upon contact with a human with a light force (e.g., 10 to 20 N or approximately 1 to 2 kgf). The retreat mode function allows the arm to retreat along each axis when a human pushes the arm of the collaborative robot 3. The reverse operation function immediately reverses the arm's motion when the collaborative robot 3 contacts a hard object, thereby reducing the pinching. The collaborative robot 3 includes external force detection sensors to detect external forces such as contact with a human. Examples of external force detection sensors include torque sensors and force sensors. Specifically, the collaborative robot 3 uses the external force detection sensors to detect contact with a human, and the robot control device 5 causes the collaborative robot 3 to stop operating in response to the external force detected by the external force detection sensors. As a result, the collaborative robot 3 can safely work in collaboration with humans.

The numerical control device 4 and the robot control device 5 are each a computer configured with hardware components such as: an arithmetic processing unit such as a CPU (Central Processing Unit); an auxiliary storage unit such as HDD (Hard Disk Drive) or SSD (Solid State Drive) that stores various computer programs; a primary storage unit such as RAM (Random Access Memory) that stores data temporarily required for the arithmetic processing unit to execute computer programs; an operation unit such as a keyboard for an operator to execute various operations; and a display unit such as a display screen that presents various types of information to the operator. The numerical control device 4 and the robot control device 5 can communicate signals with each other, for example, via Ethernet (registered trademark).

First Embodiment

FIG. 2 is a functional block diagram of the numerical control device 4 and the robot control device 5 according to the first embodiment. First, the detailed configuration of the numerical control device 4 will be described. As illustrated in FIG. 2, the numerical control device 4 implements various functions through the above-described hardware configuration, such as the functions of controlling the operation of the machine tool 2 and generating motion paths of the control axes of the collaborative robot 3.

The numerical control device 4 controls the collaborative robot 3 via the robot control device 5 using a numerical control program. Specifically, the numerical control device 4 generates various commands for controlling the operations of the collaborative robot 3 and the tool 3*b* in accordance with a numerical control program for robots, and transmits the commands to the robot control device 5. More specifically, the numerical control device 4 includes a program input unit 41, an analysis unit 42, an operation control unit 43, a storage unit 44, a robot command signal generation unit 45, a payload-switching distance setting unit 46, a payload-setting selection unit 47, and a data transmission/reception unit 48.

The program input unit 41 reads the numerical control program for robots, which consists of a plurality of robot command blocks, from the storage unit 44, and sequentially inputs the program into the analysis unit 42.

The analysis unit 42 analyzes the type of commands in the numerical control program input from the program input unit 41 for each command block, and outputs the analysis results to the operation control unit 43 and the robot command signal generation unit 45. More specifically, in a case where the type of command in the command block pertains to a machine tool numerical control command for the machine tool 2, the analysis unit 42 transmits the machine tool numerical control command to the operation control unit 43. In a case where the type of command in the command block pertains to a robotic numerical control command for the collaborative robot 3 (hereinafter also referred to as a "robot control command"), the analysis unit 42 outputs the robotic numerical control command to the robot command signal generation unit 45.

The operation control unit 43 generates machine tool control signals for controlling the operation of the machine tool 2, based on the analysis results transmitted from the analysis unit 42, and inputs the signals to the actuators that drive the various axes of the machine tool 2. The machine tool 2 operates based on the machine tool control signals input from the operation control unit 43, and machines the workpiece (not illustrated).

The storage unit 44 stores a plurality of numerical control programs created based on the operation by the operator. More specifically, the storage unit 44 stores numerical control programs consisting of a plurality of command blocks for controlling the operation of the machine tool 2, and a plurality of command blocks for controlling the operation of the collaborative robot 3. The numerical control programs stored in the storage unit 44 are described in known programming languages, such as G-code and M-code, for controlling the operation of the machine tool 2.

The storage unit 44 stores various machine coordinate values representing the positions of the axes of the machine tool 2 (e.g., the positions of the tool rest, table, etc. of the machine tool 2) operating under the numerical control program. The machine coordinate values are defined under a machine tool coordinate system, in which a reference point arbitrarily defined on or near the machine tool 2 serves as the origin. The storage unit 44 is sequentially updated through processing (not illustrated) so as to store the latest machine coordinate values, which continuously change under the numerical control program.

The storage unit 44 also stores robot coordinate values representing the position and posture of the control point of the collaborative robot 3 operating under the control of the robot control device 5 (e.g., the tip 3*a* of the arm of the collaborative robot 3), i.e., the positions of the control axes of the collaborative robot 3. The robot coordinate values are defined under a robot coordinate system that differs from the machine tool coordinate system described above. The storage unit 44 is sequentially updated through processing (not illustrated), based on the robot coordinate values obtained from the robot control device 5, so as to store the latest robot coordinate values, which continuously change under the numerical control program.

The storage unit 44 also stores teaching positions such as the starting points and ending points of the collaborative robot 3 input by the operator. Specifically, the storage unit 44 stores teaching positions of the collaborative robot 3 input via teach pendants or keyboards. The teaching positions of the collaborative robot 3 include robot coordinate values representing the positions of the control axes of the collaborative robot 3, in which the robot coordinate values are defined under the robot coordinate system that differs from the machine tool coordinate system.

The robot command signal generation unit 45 generates robot command signals for each robot command block, based on the analysis results of each robot command block input from the analysis unit 42, and writes the generated robot command signals in the data transmission/reception unit 48.

Specifically, the robot command signal generation unit 45 generates robot command signals for each robot command block, based on the robotic numerical control commands as the analysis results input from the analysis unit 42, and writes the generated robot command signals in the data transmission/reception unit 48.

The payload-switching distance setting unit 46 generates signals for setting the payload-switching distance required for switching the payload settings of the collaborative robot 3, based on the robot control commands analyzed by the analysis unit 42, and transmits the generated signals to the robot command signal generation unit 45.

Specifically, when the payload-switching distance setting command is extracted from the robot control commands analyzed by the analysis unit 42, the payload-switching distance setting unit 46 generates signals for setting the payload-switching distance, based on the payload-switching distance setting command, and transmits the generated signals to the robot command signal generation unit 45. As a result, the numerical control device 4 can notify the robot control device 5 of the payload-switching distance.

The payload-setting selection unit 47 generates signals for selecting the payload settings of the collaborative robot 3, based on the robot control commands analyzed by the analysis unit 42, and transmits the generated signals to the robot command signal generation unit 45.

Specifically, when a command to select a payload setting is extracted from the robot control commands analyzed by the analysis unit 42, the payload-setting selection unit 47 generates signals for selecting the payload settings of the collaborative robot 3, based on the command to select a payload setting, and transmits the generated signals to the robot command signal generation unit 45. As a result, the numerical control device 4 can notify the robot control device 5 of the command to select a payload setting.

The robot command signal generation unit 45 writes robot command signals, which include the signals for setting the payload-switching distance or the signals for selecting the payload settings, in the data transmission/reception unit 48.

The data transmission/reception unit 48 exchanges various types of data, such as commands and robot coordinate values, with the data transmission/reception unit 60 of the robot control device 5. Specifically, the data transmission/reception unit 48 transmits the robot command signals generated by the robot command signal generation unit 45 to the data transmission/reception unit 60 of the robot control device 5.

The data transmission/reception unit 48 transmits robot command signals, which include signals for setting the payload-switching distance and signals for selecting the payload settings of the collaborative robot 3, based on the robot control commands analyzed by the analysis unit 42, to the robot control device 5.

Next, the configuration of the robot control device 5 will be described in detail. As illustrated in FIG. 2, the robot control device 5 implements various functions through the hardware configuration, including a storage unit 51, an analysis unit 52, a robot command generation unit 53, a program management unit 54, a path control unit 55, a kinematics control unit 56, a servo control unit 57, a payload-setting selection unit 58, a dynamics control unit 59, a data transmission/reception unit 60, a contact control unit 61, and a payload-switching distance setting unit 62. The robot control device 5 uses these functional units to control the operation of the collaborative robot 3, based on the commands transmitted from the numerical control device 4.

The storage unit 51 stores robot programs and various types of information for controlling the collaborative robot 3. The storage unit 51 also stores the payload settings of the collaborative robot 3. In the present embodiment, the storage unit 51 is provided within the robot control device 5; however, the storage unit 51 may also be provided within the numerical control device 4 or in external electronic equipment or servers separate from both the numerical control device 4 and the robot control device 5.

Here, the payload settings of the collaborative robot 3 include setting the payload information and the operational area of the collaborative robot 3 where the payload settings are permitted to be switched. The payload information includes information such as the setting number of the payload, the weight of the payload, the position of the center of gravity of the payload, and the inertia of the payload. The payload information is pre-entered by the operator and stored in the storage unit 51.

FIG. 3 is a diagram illustrating an example of payload information. This payload information is displayed on the screen of the display device of the numerical control device 4. As illustrated in FIG. 3, for example, a group with a payload weight of 50 kg is assigned a plurality of payload-setting numbers (Nos. 1 to 10).

FIG. 4 is a diagram illustrating the payload information of Group 1 displayed when Group 1 in FIG. 3 is selected. The payload information of Group 1 stores the weight of the payload, the position of the center of gravity of the payload, and the inertia value of the payload. In this manner, the storage unit 51 stores the weight, the position of the center of gravity, and the inertia in association with each payload.

FIG. 5 is a diagram illustrating an example of setting the operational area of the collaborative robot 3. As illustrated in FIG. 5, the robot control device 5 sets the operational area A1 of the collaborative robot 3, in which the payload settings are permitted to be switched. The operational area A1 is set between Position 1 and Position 2 in FIG. 5. The operational area A1 is, for example, set near the workpiece. As a result, the robot control device 5 can switch the payload settings of the collaborative robot 3 within the operational area A1.

In a case where the operational area A1 is set in locations other than the vicinity of the workpiece, the collaborative robot 3 will not stop operating when the collaborative robot 3 comes into contact with the user after the payload setting has been switched. Therefore, the operational area A1 is preferably set in a location such as the vicinity of the workpiece so as not to interfere with the tasks of the collaborative robot 3 and the user.

Returning to FIG. 2, the data transmission/reception unit 60 receives robot command signals transmitted from the data transmission/reception unit 48 of the numerical control device 4. The data transmission/reception unit 60 sequentially outputs the received robot command signals to the analysis unit 52.

The analysis unit 52 analyzes the robot command signals input from the data transmission/reception unit 60. The analysis unit 52 outputs the analysis results to the robot command generation unit 53.

Upon detecting a signal for selecting the payload setting of the collaborative robot 3 in the robot command signals, the analysis unit 52 notifies the payload-setting selection unit 58, described later, of the payload setting. Upon detecting a signal for setting the payload-switching distance in the robot command signals, the analysis unit 52 notifies the payload-switching distance setting unit 62, described later, of the payload-switching distance.

The robot command generation unit 53 generates robot commands corresponding to the robot command signals, based on the analysis results of the robot command signals input from the analysis unit 52. The robot command generation unit 53 outputs the generated robot commands to the program management unit 54.

When the robot commands are input from the robot command generation unit 53, the program management unit 54 sequentially executes the robot commands, thereby generating an operation plan for the collaborative robot 3 corresponding to the robot command signals, and outputting the plan to the path control unit 55.

In a case where the robot commands input from the robot command generation unit 53 are block robot commands, the program management unit 54 adds the input block robot commands to the robot program stored in the storage unit 51. As a result, a robot program corresponding to the robot command signal transmitted from the numerical control device 4 is generated and stored in the storage unit 51. The stored robot program is activated and executed when the program management unit 54 receives a robot program activation command as the robot command.

When an operation plan is input from the program management unit 54, the path control unit 55 calculates the time-series data of the control point of the collaborative robot 3, and outputs the data to the kinematics control unit 56.

The kinematics control unit 56 calculates the target angles of each joint of the collaborative robot 3, based on the input time-series data, and inputs the target angles to the servo control unit 57.

The servo control unit 57 executes feedback control of the servo motors of the collaborative robot 3 to achieve the target angles input from the kinematics control unit 56, thereby generating robot control signals for the collaborative robot 3, and inputting the robot control signals to the servo motors of the collaborative robot 3. The servo control unit 57 generates robot control signals incorporating the torque calculated by the dynamics control unit 59 described later. As a result, the robot control device 5 can control the collaborative robot 3, based on the payload settings.

The payload-setting selection unit 58 selects a payload setting stored in the storage unit 51, based on the robot command signals analyzed by the analysis unit 52, and notifies the dynamics control unit 59 of the selected payload setting.

The dynamics control unit 59 calculates the torque to be input to the collaborative robot 3 using inverse dynamics calculations, based on the payload setting selected by the payload-setting selection unit 58. The dynamics control unit 59 outputs the calculated torque to the servo control unit 57.

Here, the inverse dynamics calculations of the collaborative robot 3 refer to a technique of calculating the input torque for each motor to implement desired motions (time-series data of positions, velocities, and accelerations of each joint) derived from the operational path plan of the collaborative robot 3. These calculations take into account external payloads applied to the hand, the gravitational forces, and the own weight of the collaborative robot 3. Examples of inverse dynamics calculations include the computed torque method and the Newton-Euler method (as disclosed in, for example, Japanese Patent Application, Publication No. H8-118275 and Japanese Patent Application, Publication No. 2015-58520).

When the payload-switching distance is notified from the analysis unit 52, the payload-switching distance setting unit 62 sets the payload-switching distance in the contact control unit 61. Here, the payload-switching distance of the collaborative robot 3 may be set based on at least one of the weight of the payload or the inertia of the payload. The payload-switching distance may also be set for each coordinate axis direction of the collaborative robot 3.

The contact control unit 61 controls the contact stop operation, based on the results of detecting external forces by the external force detection sensors of the collaborative robot 3. The contact control unit 61 prohibits the contact stop operation while the collaborative robot 3 is moving within the payload-switching distance, that is, until the collaborative robot 3 completes the movement within the payload-switching distance after the payload setting is switched by the payload-switching distance setting unit 62. Here, the contact stop operation refers to the operation to stop the operation of the collaborative robot 3 in response to external contact forces.

Figure 7:
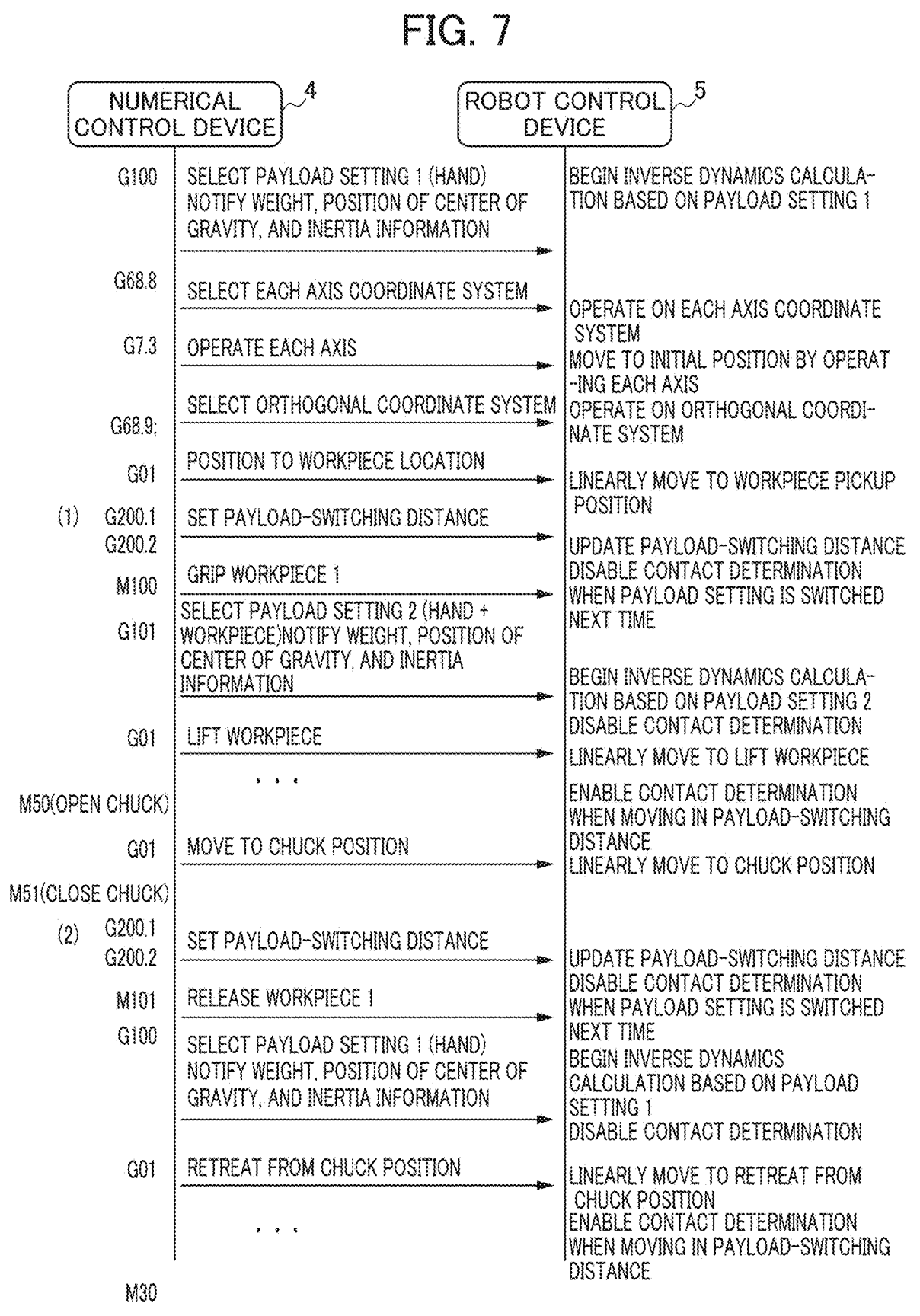

FIG. 6 is a diagram illustrating an example of a numerical control program according to the first embodiment. FIG. 7 is a sequence diagram illustrating the flow of signals and information between the numerical control device 4 and the robot control device 5 when the numerical control program illustrated in FIG. 6 is executed. The numerical control program illustrated in FIG. 6 includes commands to select payload settings and to set payload-switching distances, as described above.

In the numerical control program, first, "G100" is commanded to select the payload setting 1 (where the payload consists solely of the hand of the collaborative robot 3). When "G100" is commanded, the payload-setting selection unit 47 generates a signal for selecting the payload setting 1 of the collaborative robot 3, and transmits the generated signal to the robot control device 5 via the data transmission/reception unit 48.

As a result, the numerical control device 4 can notify the robot control device 5 of the center of gravity of the payload, the position of the center of gravity of the payload, and the inertia information of the payload in the payload setting 1. The robot control device 5 begins torque calculations for the collaborative robot 3 using inverse dynamics calculation, based on the notified payload setting 1.

Next, since the position of the collaborative robot 3 is unknown, "G68.8" is entered to select each axis coordinate system. When "G7.3 J1=_J2=_J3=_J4=_J5=_J6=_" is commanded, the robot control device 5 positions the collaborative robot 3 at the specified locations on the respective axis coordinate systems. The underscore portions of the command are replaced with the coordinate values of the specified locations for the collaborative robot 3.

Subsequently, "G68.9" is commanded to select an orthogonal coordinate system. When "G01 X_Y_Z_A_B_C_P" is commanded, the robot control device 5 causes the collaborative robot 3 to linearly move to be positioned at the specified location (workpiece position) on the orthogonal coordinate system. The underscore portions in the command are replaced with the coordinate values of the specified location for the collaborative robot 3.

Next, as illustrated in (1) of FIGS. 6 and 7, when "G200.1" is commanded, the payload-switching distance setting unit 46 generates a signal for setting the payload-switching distance in the positive direction, and transmits the generated signal to the robot control device 5 via the robot command signal generation unit 45 and the data transmission/reception unit 48. As a result, the robot control device 5 updates the payload-switching distance in the positive direction, and prohibits (disables) the contact stop operation until the collaborative robot 3 moves 5.0 mm in the +Z direction.

Furthermore, when "G200.2" is commanded, the payload-switching distance setting unit 46 generates a signal for setting the payload-switching distance in the negative direction, and transmits the generated signal to the robot control device 5 via the data transmission/reception unit 48. As a result, the robot control device 5 updates the payload-switching distance in the negative direction, and enables the contact stop operation for movements of the collaborative robot 3 in the negative direction. The robot control device 5 can disable the contact stop operation when the payload setting is switched next time. Instead of when the payload setting is switched next time, the robot control device 5 may disable the contact stop operation when the current payload setting is switched.

Subsequently, when "M100" is commanded, the robot control device 5 causes the collaborative robot 3 to close the hand to grip the workpiece. Then, "G101" is commanded, thereby selecting the payload setting 2 corresponding to the gripped workpiece, as prestored in the storage unit 51. The selected payload setting 2 is updated from the previously set payload setting 1 to the newly notified payload setting 2 by the payload-setting selection unit 58. The dynamics control unit 59 calculates inverse dynamics, based on the updated payload setting 2, and the collaborative robot 3 is controlled in accordance with the robot control commands reflecting the calculated input torque. Since the payload setting 1 is switched to the payload setting 2, the contact control unit 61 disables the contact stop operation while the collaborative robot 3 is moving within the payload-switching distance.

Next, when "G01 X_Y_Z_A_B_C_P" is commanded, the robot control device 5 causes the collaborative robot 3 to linearly move to the specified location on the orthogonal coordinate system, then the collaborative robot 3 lifts the workpiece. When the collaborative robot 3 moves outside the payload-switching distance, the contact control unit 61 enables the contact stop operation.

Subsequently, when "M50" is commanded, the robot control device 5 causes the collaborative robot 3 to open the chuck. When "G01 X_Y_Z_A_B_C_P" is commanded, the robot control device 5 causes the collaborative robot 3 to linearly move to be positioned at the chuck position. Then, when "M51" is commanded, the robot control device 5 causes the collaborative robot 3 to close the chuck.

Next, as illustrated in (2) of FIGS. 6 and 7, when "G200.1" is commanded, the payload-switching distance setting unit 46 generates a signal for setting the payload-switching distance in the positive direction, and transmits the generated signal to the robot control device 5 via the robot command signal generation unit 45 and the data transmission/reception unit 48. As a result, the robot control device 5 prohibits (disables) the contact stop operation until the collaborative robot 3 moves 5.0 mm in the +X direction.

Furthermore, when "G200.2" is commanded, the payload-switching distance setting unit 46 generates a signal for setting the payload-switching distance in the negative direction, and transmits the generated signal to the robot control device 5 via the robot command signal generation unit 45 and the data transmission/reception unit 48. As a result, the robot control device 5 updates the payload-switching distance in the negative direction, thereby enabling the contact stop operation for movements in the negative direction. The robot control device 5 can disable the contact stop operation when the payload setting is switched next time. Instead of when the payload setting is switched next time, the robot control device 5 may disable the contact stop operation when the current payload setting is switched.

Subsequently, when "M100" is commanded, the robot control device 5 causes the collaborative robot 3 to open the hand to release the workpiece. Then, "G100" is commanded, thereby selecting the payload setting 1 corresponding to the hand, as prestored in the storage unit 51. The payload-setting selection unit 58 updates the payload setting from the previously set payload setting 2 to the newly notified payload setting 1. The dynamics control unit 59 calculates inverse dynamics, based on the updated payload setting 1, and the collaborative robot 3 is controlled in accordance with the robot control commands reflecting the calculated input torque. Since the payload setting 2 is switched to payload setting 1, the contact control unit 61 disables the contact stop operation while the collaborative robot 3 is moving within the payload-switching distance.

Subsequently, when "G01 X_Y_Z_A_B_C_P" is commanded, the robot control device 5 causes the collaborative robot 3 to linearly move the hand to retreat from the chuck position. When the collaborative robot 3 moves outside the payload-switching distance, the contact control unit 61 enables the contact stop operation. Finally, "M30" is commanded, ending the numerical control program.

As described above, according to the first embodiment, the numerical control device 4 includes: the analysis unit 42 that analyzes robot control commands in the numerical control program; the payload-switching distance setting unit 46 that generates signals for setting the payload-switching distance required for switching the payload settings of the collaborative robot 3, based on the robot control commands analyzed by the analysis unit 42; the payload-setting selection unit 47 that generates signals for selecting the payload settings of the collaborative robot 3, based on the robot control commands analyzed by the analysis unit 42; and the robot command signal generation unit 45 that generates robot command signals, including signals for setting the payload-switching distance and signals for selecting the payload settings of the collaborative robot 3, based on the robot control commands analyzed by the analysis unit 42, and transmits the robot command signals to the robot control device 5. After switching the payload settings, the robot control device 5 prohibits the collaborative robot 3 from executing a contact stop operation to stop operating in response to external contact forces while the collaborative robot 3 is moving within the payload-switching distance.

With this configuration, the numerical control device 4 ensures that the collaborative robot 3 does not execute contact stop operations within the specified payload-switching distance after changing the payload setting, thereby allowing for preventing the collaborative robot 3 from erroneously executing contact stop operations while the collaborative robot 3 is interacting with a workpiece, such as picking up or placing the workpiece.

The payload settings of the collaborative robot 3 include setting the payload information and the operational area of the robot where the payload settings are permitted to be switched. With this configuration, the numerical control device 4 can appropriately manage the switching of the payload setting and the setting of the payload-switching distance.

The payload-switching distance of the collaborative robot 3 may be set based on at least one of the weight or inertia of the payload. The payload-switching distance of the collaborative robot 3 may also be set individually for each coordinate axis direction of the collaborative robot 3. With this configuration, the numerical control device 4 can set payload-switching distances suited to the operation of the collaborative robot 3.

In the numerical control system 1, the numerical control device 4 includes: the analysis unit 42 that analyzes robot control commands in the numerical control program; the payload-switching distance setting unit 46 that generates signals for setting the payload-switching distance required for switching the payload settings of the collaborative robot 3, based on the robot control commands analyzed by the analysis unit 42; the payload-setting selection unit 47 that generates signals for selecting the payload settings of the collaborative robot 3, based on the robot control commands analyzed by the analysis unit 42; and the robot command signal generation unit 45 that generates robot command signals including signals, including signals for setting the payload-switching distance and signals for selecting payload settings of the collaborative robot 3, based on the robot control commands analyzed by the analysis unit 42, and transmits the robot command signals to the robot control device 5.

Furthermore, the robot control device 5 includes: the payload-setting selection unit 58 that switches payload settings, based on the robot command signals; the dynamics control unit that executes inverse dynamics calculations for the collaborative robot 3 in accordance with the payload settings, based on the robot command signals; the payload-switching distance setting unit 62 that sets the payload-switching distance, based on the robot command signals; and the contact control unit 61 that, after switching the payload settings in response to the notification of the payload setting, prohibits the collaborative robot 3 from executing a contact stop operation to stop operating in response to external contact forces while the collaborative robot 3 is moving within the payload-switching distance.

With this configuration, the numerical control system 1 ensures that the collaborative robot 3 does not execute a contact stop operation within the specified payload-switching distance after changing the payload settings, thereby allowing for preventing the collaborative robot 3 from erroneously executing contact stop operations while the collaborative robot 3 is interacting with a workpiece, such as picking up or placing the workpiece.

Second Embodiment

FIG. 8 is a functional block diagram of the numerical control device 4 and the robot control device 5 according to the second embodiment. In the description of the second embodiment, components identical to those in the first embodiment are denoted by the same reference numerals, and their description is omitted or simplified. The numerical control device 4 and the robot control device 5 of the second embodiment include a prohibition signal output unit 49 and an operation switching unit 63, which primarily differ from the first embodiment, while other configurations are similar to those of the first embodiment illustrated in FIGS. 2 and 3.

The payload-setting selection unit 47 generates signals for selecting the payload settings of the collaborative robot 3, based on the robot control commands analyzed by the analysis unit 42, and transmits the generated signals to the robot command signal generation unit 45.

Specifically, when a command to select a payload setting is extracted from the robot control commands analyzed by the analysis unit 42, the payload-setting selection unit 47 generates signals for selecting the payload settings of the collaborative robot 3, based on the command to select a payload setting, and transmits the generated signals to the robot command signal generation unit 45. As a result, the numerical control device 4 can notify the robot control device 5 of the command to select payload settings.

The prohibition signal output unit 49 generates a contact stop operation prohibition signal for prohibiting the collaborative robot 3 from executing a contact stop operation, based on the robot control commands analyzed by the analysis unit 42, and transmits the generated contact stop operation prohibition signal to the robot command signal generation unit 45.

Specifically, when a command to enable the contact stop operation prohibition signal is extracted from the robot control commands analyzed by the analysis unit 42, the prohibition signal output unit 49 generates a contact stop operation prohibition signal in response to the command to enable the contact stop operation prohibition signal, and transmits the generated contact stop operation prohibition signal to the robot command signal generation unit 45. As a result, the numerical control device 4 can notify the robot control device 5 of the command to prohibit (disable) the contact stop operation.

When a command to disable the contact stop operation prohibition signal is extracted from the robot control commands analyzed by the analysis unit 42, the prohibition signal output unit 49 generates a signal to disable the contact stop operation prohibition signal in response to the command to disable the contact stop operation prohibition signal, and transmits the generated signal to the robot command signal generation unit 45. As a result, the numerical control device 4 can notify the robot control device 5 of the command to enable the contact stop operation.

The robot command signal generation unit 45 generates robot command signals for each robot command block, based on the analysis results of each robot command block input from the analysis unit 42, and writes the generated robot command signals in the data transmission/reception unit 48. The robot command signal generation unit 45 also writes robot command signals, including signals for selecting payload settings, contact stop operation prohibition signals, or signals for disabling the contact stop operation prohibition signals, in the data transmission/reception unit 48.

The data transmission/reception unit 48 transmits robot command signals, including contact stop operation prohibition signals, signals for disabling the contact stop operation prohibition signals, and signals for selecting payload settings of the collaborative robot 3, to the robot control device 5, based on the robot control commands analyzed by the analysis unit 42.

The operation switching unit 63 switches the enablement or disablement of the contact stop operation in the contact control unit 61, based on the robot command signals analyzed by the analysis unit 52. Specifically, when a contact stop operation prohibition signal is extracted from the robot command signals, the operation switching unit 63 sets the contact stop operation to be disabled after the payload setting is switched next time. Conversely, when a signal to disable (turn off) the contact stop operation prohibition signal is extracted from the robot command signals, the operation switching unit 63 sets the contact stop operation to be enabled after the payload setting is switched next time.

After the payload setting is switched based on the notification of the payload setting, the contact control unit 61 prohibits the collaborative robot 3 from executing a contact stop operation to stop operating in response to external contact forces, based on the contact stop operation prohibition signal.

Specifically, when the operation switching unit 63 disables the contact stop operation, based on the contact stop operation prohibition signal, the contact control unit 61 sets the contact stop operation to be disabled after the next payload setting is switched next time. When the operation switching unit 63 enables the contact stop operation, based on the signal to disable the contact stop operation prohibition signal, the contact control unit 61 sets the contact stop operation to be enabled after the payload setting is switched FIG. 9 is a diagram illustrating an example of a numerical control program according to the second embodiment. FIG. 10 is a sequence diagram illustrating the flow of signals and information between the numerical control device 4 and the robot control device 5 when executing the numerical control program illustrated in FIG. 9. The numerical control program illustrated in FIG. 9 includes commands to select payload settings and output contact stop operation prohibition signals, as described above.

In the numerical control program, "G100" is commanded to Select the payload setting 1 (where the payload consists solely of the hand of the collaborative robot 3). When "G100" is commanded, the payload-setting selection unit 47 generates a signal for selecting the payload setting 1 of the collaborative robot 3, and transmits the generated signal to the robot control device 5 via the robot command signal generation unit 45 and the data transmission/reception unit 48.

As a result, the numerical control device 4 can notify the robot control device 5 of the center of gravity of the payload, the position of the center of gravity of the payload, and the inertia information of the payload in the payload setting 1. Based on the notified payload setting 1, the robot control device 5 begins calculating the torque to be applied to the collaborative robot 3 using inverse dynamics.

Next, since the position of the collaborative robot 3 is unknown, "G68.8" is entered to select the individual axis coordinate systems. When "G7.3 J1=_J2=_J3=_J4=_J5=_J6=" is commanded, the robot control device 5 causes the collaborative robot 3 to be positioned at the specified locations on the respective axis coordinate systems. The underscores in the command are replaced with the coordinate values of the specified locations for the collaborative robot 3.

Subsequently, "G68.9" is commanded to select an orthogonal coordinate system. When "G01 X_Y_Z_A_B_C_P" is commanded, the robot control device 5 causes the collaborative robot 3 to linearly move to be positioned at the specified location (workpiece position) on the orthogonal coordinate system. The underscores in the command are replaced with the coordinate values of the specified locations for the collaborative robot 3.

Next, when "M100" is commanded, the robot control device 5 causes the collaborative robot 3 to close the hand to grip the workpiece.

Subsequently, as illustrated in (11) of FIGS. 9 and 10, when "G200.1" is commanded, the prohibition signal output unit 49 generates a contact stop operation prohibition signal to prohibit the collaborative robot 3 from executing a contact stop operation, and transmits the generated contact stop operation prohibition signal to the robot control device 5 via the robot command signal generation unit 45 and the data transmission/reception unit 48. As a result, the robot control device 5 can disable the contact stop operation in response to the contact stop operation prohibition signal when the payload setting is switched next time.

Subsequently, "G101" is commanded, selecting the payload setting 2 corresponding to the gripped workpiece, as prestored in the storage unit 51. The payload-setting selection unit 58 updates the selected payload setting 2 from the previously set payload setting 1 to the newly notified payload setting 2. The dynamics control unit 59 calculates inverse dynamics based on the updated payload setting 2, and the collaborative robot 3 is controlled in accordance with the robot control commands reflecting the calculated input torque. Since the payload setting 1 is switched to the payload setting 2, the contact control unit 61 disables the contact stop operation of the collaborative robot 3.

Subsequently, when "G01 X_Y_Z_A_B_C_P" is commanded, the robot control device 5 causes the collaborative robot 3 to linearly move to the specified location (workpiece position) on the orthogonal coordinate system, lifting the workpiece.

Subsequently, as illustrated in (12) of FIGS. 9 and 10, when "G200.0" is commanded, the prohibition signal output unit 49 generates a contact stop operation prohibition signal to prohibit the collaborative robot 3 from executing a contact stop operation, and transmits a signal to disable (turn off) the generated contact stop operation prohibition signal to the robot control device 5 via the robot command signal generation unit 45 and the data transmission/reception unit 48. As a result, the robot control device 5 can enable the contact stop operation in response to the signal to disable the contact stop operation prohibition signal.

Next, when "M50" is commanded, the robot control device 5 causes the collaborative robot 3 to open the chuck. When "G01 X_Y_Z_A_B_C_P_" is commanded, the robot control device 5 causes the collaborative robot 3 to linearly move to be positioned at the chuck position.

Subsequently, when "M51" is commanded, the robot control device 5 causes the collaborative robot 3 to close the chuck. Next, when "M101" is commanded, the robot control device 5 causes the collaborative robot 3 to open the hand to release the workpiece.

Subsequently, as illustrated in (13) of FIGS. 9 and 10, when "G200.1" is commanded, the prohibition signal output unit 49 generates a contact stop operation prohibition signal to prohibit the collaborative robot 3 from executing a contact stop operation, and transmits the generated contact stop operation prohibition signal to the robot control device 5 via the robot command signal generation unit 45 and the data transmission/reception unit 48. As a result, the robot control device 5 can disable the contact stop operation in response to the contact stop operation prohibition signal when the payload setting is switched next time.

Subsequently, "G100" is commanded, selecting the payload setting 1 corresponding to the previously gripped workpiece, as prestored in the storage unit 51. The payload-setting selection unit 58 updates the payload setting from the previously set payload setting 2 to the newly notified payload setting 1. The dynamics control unit 59 calculates inverse dynamics based on the updated payload setting 1, and the collaborative robot 3 is controlled in accordance with the robot control commands reflecting the calculated input torque. Since the payload setting 2 is switched to the payload setting 1, the contact control unit 61 disables the contact stop operation of the collaborative robot 3.

Next, when "G01 X_Y_Z_A_B_C_P_" is commanded, the robot control device 5 causes the collaborative robot 3 to move linearly from the chuck position to retreat from the chuck position.

Subsequently, as illustrated in (14) of FIGS. 9 and 10, when "G200.0" is commanded, the prohibition signal output unit 49 generates a contact stop operation prohibition signal to prohibit the collaborative robot 3 from executing a contact stop operation, and transmits a signal to disable (turn off) the generated contact stop operation prohibition signal the generated signal to the robot control device 5 via the robot command signal generation unit 45 and the data transmission/reception unit 48. As a result, the robot control device 5 can enable the contact stop operation, in response to the signal to disable the contact stop operation prohibition signal. Finally, "M30" is commanded, ending the numerical control program.

As described above, according to the second embodiment, the numerical control device 4 includes: the analysis unit 42 that analyzes robot control commands in the numerical control program; the prohibition signal output unit 49 that generates a contact stop operation prohibition signal to prohibit the collaborative robot 3 from executing a contact stop operation, based on the robot control commands analyzed by the analysis unit 42; the payload-setting selection unit 47 that generates signals for selecting the payload settings of the collaborative robot 3, based on the robot control commands analyzed by the analysis unit 42; and the robot command signal generation unit 45 that generates robot command signals, including contact stop operation prohibition signals and signals for selecting payload settings of the collaborative robot 3, based on the robot control commands analyzed by the analysis unit 42, and transmits the robot command signals to the robot control device 5. After the payload settings are switched, the robot control device 5 disables the contact stop operation of the robot command signal generation unit 45 to stop the operation of the robot command signal generation unit 45 in response to external contact forces, in response to the contact stop operation prohibition signal.

With this configuration, the numerical control device 4 ensures that the collaborative robot 3 does not execute a contact stop operation within the specified payload-switching distance after the payload setting is changed, thereby allowing for preventing the collaborative robot 3 from erroneously executing contact stop operations while the collaborative robot 3 is interacting with a workpiece, such as picking up or placing the workpiece.

In the numerical control system 1, the numerical control device 4 includes: the analysis unit 42 that analyzes robot control commands in the numerical control program; the prohibition signal output unit 49 that generates a contact stop operation prohibition signal to prohibit the collaborative robot 3 from executing a contact stop operation, based on the robot control commands analyzed by the analysis unit 42; the payload-setting selection unit 47 that generates signals for selecting the payload settings of the collaborative robot 3, based on the robot control commands analyzed by the analysis unit 42; and the robot command signal generation unit 45 that generates robot command signals, including the contact stop operation prohibition signal and signals for selecting the payload settings of the collaborative robot 3, based on the robot control commands analyzed by the analysis unit 42, and transmits the robot command signals to the robot control device 5.

Furthermore, the robot control device 5 includes: the payload-setting selection unit 58 that switches the payload settings, based on the robot command signals; the dynamics control unit 59 that executes inverse dynamics calculations for the collaborative robot 3 in accordance with the payload settings, based on the robot command signals; and the contact control unit 61 that prohibits the collaborative robot 3 from executing a contact stop operation to stop operating in response to external contact forces, based on the contact stop operation prohibition signal, after the payload setting is switched in response to the notification of the payload setting.

With this configuration, the numerical control system 1 prevents the collaborative robot 3 from executing a contact stop operation within the specified payload-switching distance after the payload setting is changed, thereby allowing for preventing the collaborative robot 3 from erroneously executing contact stop operations while the collaborative robot 3 is interacting with a workpiece, such as picking up or placing the workpiece.

While the embodiments of the present invention have been described above, the numerical control system 1 can be implemented using hardware, software, or a combination thereof. Similarly, the control methods executed by the numerical control system 1 can also be implemented using hardware, software, or a combination thereof. Implementation using software refers to execution by a computer that reads and executes a program.

The program can be stored in various types of non-transitory computer-readable media and supplied to a computer. Non-transitory computer-readable media include various types of tangible storage media. Examples of non-transitory computer-readable media include magnetic storage media (e.g., hard disk drives), magneto-optical storage media (e.g., magneto-optical disks), CD-ROM (Read Only Memory), CD-R, CD-R/W, and semiconductor memories (e.g., mask ROM, PROM (Programmable ROM), EPROM (Erasable PROM), flash ROM, and RAM (Random Access Memory)).

While the present disclosure has been described in detail, the present disclosure is not limited to the specific embodiments described above. These embodiments may be subject to various additions, replacements, modifications, and partial deletions, within a scope that does not deviate from the essence of the present disclosure or the scope of the claims and equivalents thereof. Additionally, these embodiments may be implemented in combination. For example, in the above-described embodiments, the order of operations or processing is merely exemplary and is not limited to the specific sequence. The same applies to numerical values or equations described in the embodiments.

The following additional remarks are disclosed concerning the above embodiments and modifications.

(Additional Remark 1)

A numerical control device (4) that controls a robot (3) via a robot control device (5) using a numerical control program, in which the numerical control device (4) includes:

an analysis unit (42) that analyzes a robot control command in the numerical control program;

a payload-switching distance setting unit (46) that generates a signal for setting a payload-switching distance required for switching a payload setting of the robot, based on the robot control command analyzed by the analysis unit;

a payload-setting selection unit (47) that generates a signal for selecting the payload setting of the robot, based on the robot control command analyzed by the analysis unit; and a robot command signal generation unit (45) that generates a robot command signal, including a signal for setting the payload-switching distance and a signal for selecting the payload setting of the robot, based on the robot control command analyzed by the analysis unit, and transmits the robot command signal to the robot control device, in which after switching the payload setting, the robot control device (5) prohibits the robot from executing a contact stop operation to stop operating in response to an external contact force while the robot is moving within the payload-switching distance.

(Additional Remark 2)

The numerical control device (4) as described in Additional Remark 1, in which the payload setting of the robot includes setting payload information and an operational area of the robot where the payload setting is permitted to be switched.

(Additional Remark 3)

The numerical control device (4) as described in Additional Remark 1, in which the payload-switching distance of the robot is set based on at least one of weight or inertia of a payload.

(Additional Remark 4)

The numerical control device (4) as described in Additional Remark 1, in which the payload-switching distance of the robot is set individually for each coordinate axis direction of the robot.

(Additional Remark 5)

The numerical control device as described in Additional Remark 1, in which the robot is a collaborative robot that stops operating upon detecting contact with a human.

(Additional Remark 6)

A numerical control system (1) that controls a robot (3) via a robot control device (5) using a numerical control program of a numerical control device (4), in which the numerical control device (4) includes:

an analysis unit (42) that analyzes a robot control command in the numerical control program;

a payload-switching distance setting unit (46) that generates a signal for setting a payload-switching distance required for switching a payload setting of the robot, based on the robot control command analyzed by the analysis unit;

a payload-setting selection unit (47) that generates a signal for selecting the payload setting of the robot, based on the robot control command analyzed by the analysis unit; and a robot command signal generation unit (45) that generates a robot command signal, including a signal for setting the payload-switching distance and a signal for selecting the payload setting of the robot, based on the robot control command analyzed by the analysis unit, and transmits the robot command signal to the robot control device, in which the robot control device (5) includes:

a robot-side payload-setting selection unit (58) that switches the payload setting, based on the robot command signal;

a dynamics control unit (59) that executes inverse dynamics calculation for the robot in accordance with the payload setting, based on the robot command signal;

a robot-side payload-switching distance setting unit (62) that sets the payload-switching distance, based on the robot command signal; and a contact control unit (61) that prohibits the robot from executing a contact stop operation to stop operating in response to an external contact force while the robot is moving within the payload-switching distance, after switching the payload setting in response to a notification of the payload setting.

(Additional Remark 7)

The numerical control system (1) as described in Additional Remark 6, in which the payload setting of the robot includes setting payload information and an operational area of the robot where the payload setting is permitted to be switched.

(Additional Remark 8)

The numerical control system (1) as described in Additional Remark 6, in which the payload-switching distance of the robot is set based on at least one of weight or inertia of a payload.

(Additional Remark 9)

The numerical control system (1) as described in Additional Remark 6, in which the payload-switching distance of the robot is set individually for each coordinate axis direction of the robot.

(Additional Remark 10)

The numerical control system as described in Additional Remark 6, in which the robot is a collaborative robot that stops operating upon detecting contact with a human.

(Additional Remark 11)

A numerical control device (4) that controls a robot via a robot control device (5) using a numerical control program, in which the numerical control device (4) includes:

an analysis unit (42) that analyzes a robot control command in the numerical control program;

a prohibition signal output unit (49) that generates a contact stop operation prohibition signal to prohibit the robot from executing a contact stop operation, based on the robot control command analyzed by the analysis unit;

a payload-setting selection unit (47) that generates a signal for selecting a payload setting of the robot, based on the robot control command analyzed by the analysis unit; and a robot command signal generation unit (45) that generates a robot command signal, including the contact stop operation prohibition signal and a signal for selecting the payload setting of the robot, based on the robot control command analyzed by the analysis unit, and transmits the robot command signal to the robot control device, in which after switching the payload setting, the robot control device (5) prohibits the robot from executing a contact stop operation to stop operating in response to an external contact force, based on the contact stop operation prohibition signal.

(Additional Remark 12)

The numerical control device (4) as described in Additional Remark 11, in which the payload setting of the robot includes setting payload information and an operational area of the robot where the payload setting is permitted to be switched.

(Additional Remark 13)

The numerical control device as described in Additional Remark 11, in which the robot is a collaborative robot that stops operating upon detecting contact with a human.

(Additional Remark 14)

A numerical control system (1) that controls a robot via a robot control device (5) using a numerical control program of a numerical control device (4), in which the numerical control device (4) includes:

an analysis unit (42) that analyzes a robot control command in the numerical control program;

a prohibition signal output unit (49) that generates a contact stop operation prohibition signal to prohibit the robot from executing a contact stop operation, based on the robot control command analyzed by the analysis unit;

a payload-setting selection unit (47) that generates a signal for selecting a payload setting of the robot, based on the robot control command analyzed by the analysis unit; and a robot command signal generation unit (45) that generates a robot command signal, including the contact stop operation prohibition signal and a signal for selecting the payload setting of the robot, based on the robot control command analyzed by the analysis unit, and transmits the robot command signal to the robot control device, in which the robot control device (5) includes:

a robot-side payload-setting selection unit (58) that switches the payload setting, based on the robot command signal;

a dynamics control unit (59) that executes inverse dynamics calculation for the robot in accordance with the payload setting, based on the robot command signal; and a contact control unit (61) that prohibits the robot from executing a contact stop operation to stop operating in response to an external contact force, based on the contact stop operation prohibition signal, after switching the payload setting in response to a notification of the payload setting.

(Additional Remark 15)

The numerical control system as described in Additional Remark 14, in which the payload setting of the robot includes setting payload information and an operational area of the robot where the payload setting is permitted to be switched.

(Additional Remark 16)

The numerical control system as described in Additional Remark 14, in which the robot is a collaborative robot that stops operating upon detecting contact with a human.

EXPLANATION OF REFERENCE NUMERALS

1: numerical control system

2: machine tool

3: collaborative robot
4: numerical control device
5: robot control device
41: program input unit
42: analysis unit
43: operation control unit
44: storage unit
45: robot command signal generation unit
46: payload-switching distance setting unit
47: payload-setting selection unit
48: data transmission/reception unit
49: prohibition signal output unit
51: storage unit
52: analysis unit
53: robot command generation unit
54: program management unit
55: path control unit
56: kinematics control unit
57: servo control unit
58: payload-setting selection unit
59: dynamics control unit
60: data transmission/reception unit
61: contact control unit
62: payload-switching distance setting unit
63: operation switching unit

The invention claimed is:

1. A numerical control device that controls a robot via a robot control device using a numerical control program, the numerical control device comprising:
- an analysis unit that analyzes a robot control command in the numerical control program;
- a payload-switching distance setting unit that generates a signal for setting a payload-switching distance required for switching a payload setting of the robot, based on the robot control command analyzed by the analysis unit;
- a payload-setting selection unit that generates a signal for selecting the payload setting of the robot, based on the robot control command analyzed by the analysis unit; and
- a robot command signal generation unit that generates a robot command signal, based on the signal for setting the payload-switching distance, the signal for selecting the payload setting of the robot, and the robot control command analyzed by the analysis unit, and transmits the robot command signal to the robot control device, wherein
- after switching the payload setting, the robot control device prohibits the robot from executing a contact stop operation to stop operating in response to an external contact force while the robot is moving within the payload-switching distance.

2. The numerical control device according to claim 1, wherein the payload setting of the robot includes setting payload information and an operational area of the robot where the payload setting is permitted to be switched.

3. The numerical control device according to claim 1, wherein the payload-switching distance of the robot is set based on at least one of weight or inertia of a payload.

4. The numerical control device according to claim 1, wherein the payload-switching distance of the robot is set individually for each coordinate axis direction of the robot.

5. The numerical control device according to claim 1, wherein the robot is a collaborative robot that stops operating upon detecting contact with a human.

6. A numerical control system that controls a robot via a robot control device using a numerical control program of a numerical control device, the numerical control device comprising:
- an analysis unit that analyzes a robot control command in the numerical control program;
- a payload-switching distance setting unit that generates a signal for setting a payload-switching distance required for switching a payload setting of the robot, based on the robot control command analyzed by the analysis unit;
- a payload-setting selection unit that generates a signal for selecting the payload setting of the robot, based on the robot control command analyzed by the analysis unit; and
- a robot command signal generation unit that generates a robot command signal, based on the signal for setting the payload-switching distance, the signal for selecting the payload setting of the robot, and the robot control command analyzed by the analysis unit, and transmits the robot command signal to the robot control device, the robot control device comprising:
- a robot-side payload-setting selection unit that switches the payload setting, based on the robot command signal;
- a dynamics control unit that executes inverse dynamics calculation for the robot in accordance with the payload setting, based on the robot command signal;
- a robot-side payload-switching distance setting unit that sets the payload-switching distance, based on the robot command signal; and
- a contact control unit that prohibits the robot from executing a contact stop operation to stop operating in response to an external contact force while the robot is moving within the payload-switching distance, after switching the payload setting in response to a notification of the payload setting.

7. The numerical control system according to claim 6, wherein the payload setting of the robot includes setting payload information and an operational area of the robot where the payload setting is permitted to be switched.

8. The numerical control system according to claim 6, wherein the payload-switching distance of the robot is set based on at least one of weight or inertia of a payload.

9. The numerical control system according to claim 6, wherein the payload-switching distance of the robot is set individually for each coordinate axis direction of the robot.

10. The numerical control system according to claim 6, wherein the robot is a collaborative robot that stops operating upon detecting contact with a human.

11. A numerical control device that controls a robot via a robot control device using a numerical control program, the numerical control device comprising:
- an analysis unit that analyzes a robot control command in the numerical control program;
- a prohibition signal output unit that generates a contact stop operation prohibition signal to prohibit the robot from executing a contact stop operation, based on the robot control command analyzed by the analysis unit;
- a payload-setting selection unit that generates a signal for selecting a payload setting of the robot, based on the robot control command analyzed by the analysis unit; and
- a robot command signal generation unit that generates a robot command signal, based on the contact stop operation prohibition signal, the signal for selecting the payload setting of the robot, and the robot control command analyzed by the analysis unit, and transmits the robot command signal to the robot control device, wherein after switching the payload setting, the robot control device prohibits the robot from executing the contact stop operation to stop operating in response to an external contact force, based on the contact stop operation prohibition signal.

12. The numerical control device according to claim 11, wherein the payload setting of the robot includes setting payload information and an operational area of the robot where the payload setting is permitted to be switched.

13. The numerical control device according to claim 11, wherein the robot is a collaborative robot that stops operating upon detecting contact with a human.

14. A numerical control system that controls a robot via a robot control device using a numerical control program of a numerical control device, the numerical control device comprising:

an analysis unit that analyzes a robot control command in the numerical control program;

a prohibition signal output unit that generates a contact stop operation prohibition signal to prohibit the robot from executing a contact stop operation, based on the robot control command analyzed by the analysis unit;

a payload-setting selection unit that generates a signal for selecting a payload setting of the robot, based on the robot control command analyzed by the analysis unit; and a robot command signal generation unit that generates a robot command signal, based on the contact stop operation prohibition signal, the signal for selecting the payload setting of the robot, and the robot control command analyzed by the analysis unit, and transmits the robot command signal to the robot control device, the robot control device comprising:

a robot-side payload-setting selection unit that switches the payload setting, based on the robot command signal;

a dynamics control unit that executes inverse dynamics calculation for the robot in accordance with the payload setting, based on the robot command signal; and a contact control unit that prohibits the robot from executing the contact stop operation to stop operating in response to an external contact force, based on the contact stop operation prohibition signal, after switching the payload setting in response to a notification of the payload setting.

15. The numerical control system according to claim 14, wherein the payload setting of the robot includes setting payload information and an operational area of the robot where the payload setting is permitted to be switched.

16. The numerical control system according to claim 14, wherein the robot is a collaborative robot that stops operating upon detecting contact with a human.

* * * * *